US006968648B2

(12) United States Patent
Bourque et al.

(10) Patent No.: US 6,968,648 B2
(45) Date of Patent: Nov. 29, 2005

(54) PROTECTIVE EDGE COVER FOR AN OPENING IN A WINDOW ASSEMBLY

(75) Inventors: Jeffrey Gerard Bourque, Novi, MI (US); Paul Joseph Kolokowski, Southgate, MI (US); Michael James Lesle, Toledo, OH (US); Lawrence R. Lyke, Novi, MI (US); Thomas William Peyton, Jr., Allen Park, MI (US); Scott Saxon, Northville, MI (US); Marcus Tanksley, Farmington Hills, MI (US); Rick Mark Weinart, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 48 days.

(21) Appl. No.: 10/690,129

(22) Filed: Oct. 21, 2003

(65) Prior Publication Data

US 2004/0098920 A1 May 27, 2004

Related U.S. Application Data

(60) Provisional application No. 60/429,811, filed on Nov. 27, 2002.

(51) Int. Cl.[7] .................................................. E05B 1/00
(52) U.S. Cl. .......................................... 49/460; 296/153
(58) Field of Search .......................... 49/116, 118, 413, 49/460; 296/153

(56) References Cited

U.S. PATENT DOCUMENTS

| | | | | |
|---|---|---|---|---|
| 1,308,993 | A | | 7/1919 | Ridington |
| 1,375,914 | A | | 4/1921 | Kimbark |
| 1,388,091 | A | | 8/1921 | Bresnahan |
| 1,859,392 | A | | 5/1932 | Harper |
| 2,803,493 | A | * | 8/1957 | Haefliger .................... 296/153 |
| 2,877,049 | A | | 3/1959 | Lucas |
| 3,902,752 | A | | 9/1975 | Pelletier |
| 4,730,413 | A | | 3/1988 | Henry |
| 4,758,043 | A | | 7/1988 | Reynaldos |
| 4,805,957 | A | * | 2/1989 | Fletcher ...................... 296/153 |
| 5,129,678 | A | | 7/1992 | Gurbacki |
| D354,937 | S | | 1/1995 | Nentwich |
| 5,473,840 | A | | 12/1995 | Gillen et al. |
| 5,505,023 | A | | 4/1996 | Gillen et al. |
| 5,791,538 | A | * | 8/1998 | Bain, III ..................... 224/663 |
| 6,018,913 | A | | 2/2000 | Lin |
| 6,125,585 | A | | 10/2000 | Koneval et al. |
| 6,315,327 | B1 | | 11/2001 | Woolsey |
| 6,526,708 | B1 | | 3/2003 | Hartley et al. |
| 2003/0137161 | A1 | | 7/2003 | Gillen |
| 2003/0213179 | A1 | * | 11/2003 | Galer .......................... 49/413 |

* cited by examiner

*Primary Examiner*—Jerry Redman
(74) *Attorney, Agent, or Firm*—Brinks Hofer Gilson & Lione

(57) ABSTRACT

The present invention provides a window assembly having a fixed window with an opening, a slidable panel that slides relative to the fixed window to cover or expose the opening in the fixed window, and a covering to protect the lower edge of the window opening.

5 Claims, 3 Drawing Sheets

PROTECTIVE EDGE COVER FOR AN OPENING IN A WINDOW ASSEMBLY

RELATED APPLICATION

This application claims the benefit of the filing date under 35 U.S.C. § 119(e) of U.S. Provisional Application No. 60/429,811, filed Nov. 27, 2002, the entire contents of which is incorporated herein by reference.

BACKGROUND

The present invention relates generally to a window assembly. More specifically, the invention relates to a window guard to protect an edge in an opening of a window.

While the primary functional purpose of such a sliding window assembly in a vehicle is primarily intended for ventilation, it is not uncommon for users to take advantage of the window as a pass-thru opening for supporting lengthy cargo and thereby minimize rearward extension of the cargo outside the vehicle. The downward force exerted by resting such cargo on the exposed edge of the window opening should, in most cases, not be of major concern by itself, since the compressive strength of glass is generally quite good. However, lateral forces (fore & aft), abrasion, and/or impact forces resulting from such cargo resting on the glass could be of concern.

From the above, it is seen that there exists a need for protection of certain exposed edges in a window opening.

BRIEF SUMMARY OF THE INVENTION

In overcoming the above mentioned and other drawbacks, the present invention provides a window assembly, such as the slider backlight assembly commonly found on pick-up truck vehicles, having a fixed window with an opening, a slidable panel that slides relative to the fixed window to cover or expose the opening in the fixed window, and a covering to protect the lower edge of the window opening.

The covering may be a protective sheet attached at one end to a lower member or portion of the window assembly. The other end remains unattached so as to create a flexible flap of material. When needed, the protective cover is simply placed over the exposed bottom edge of the opening to protect the edge from damage by objects resting on the edge, and when not in use the cover is allowed to hang freely or otherwise fastened out of the way below the window opening. The protective material could be suitably colored and textured to coordinate with adjacent interior trim materials. The covering is a flexible, durable sheet.

The fixed end of the covering may be attached to the interior or exterior of the fixed window with a suitable connection means. Various attachment means, both permanent and releasable, can be used to secure the cover in place. The cover may be a substantially U-shaped clip that covers the edge in a removable manner.

Further features and advantages will become apparent from the detailed description and from the claims.

BRIEF DESCRIPTION OF THE DRAWINGS

The accompanying drawings, incorporated in and forming a part of the specification, illustrate several aspects of the present invention. The components in the figures are not necessarily to scale, emphasis instead being placed on illustrating the principles of the invention. Moreover, in the figures, like reference numerals designate corresponding parts throughout the views. In the drawings.

DETAILED DESCRIPTION

Figure 1A:
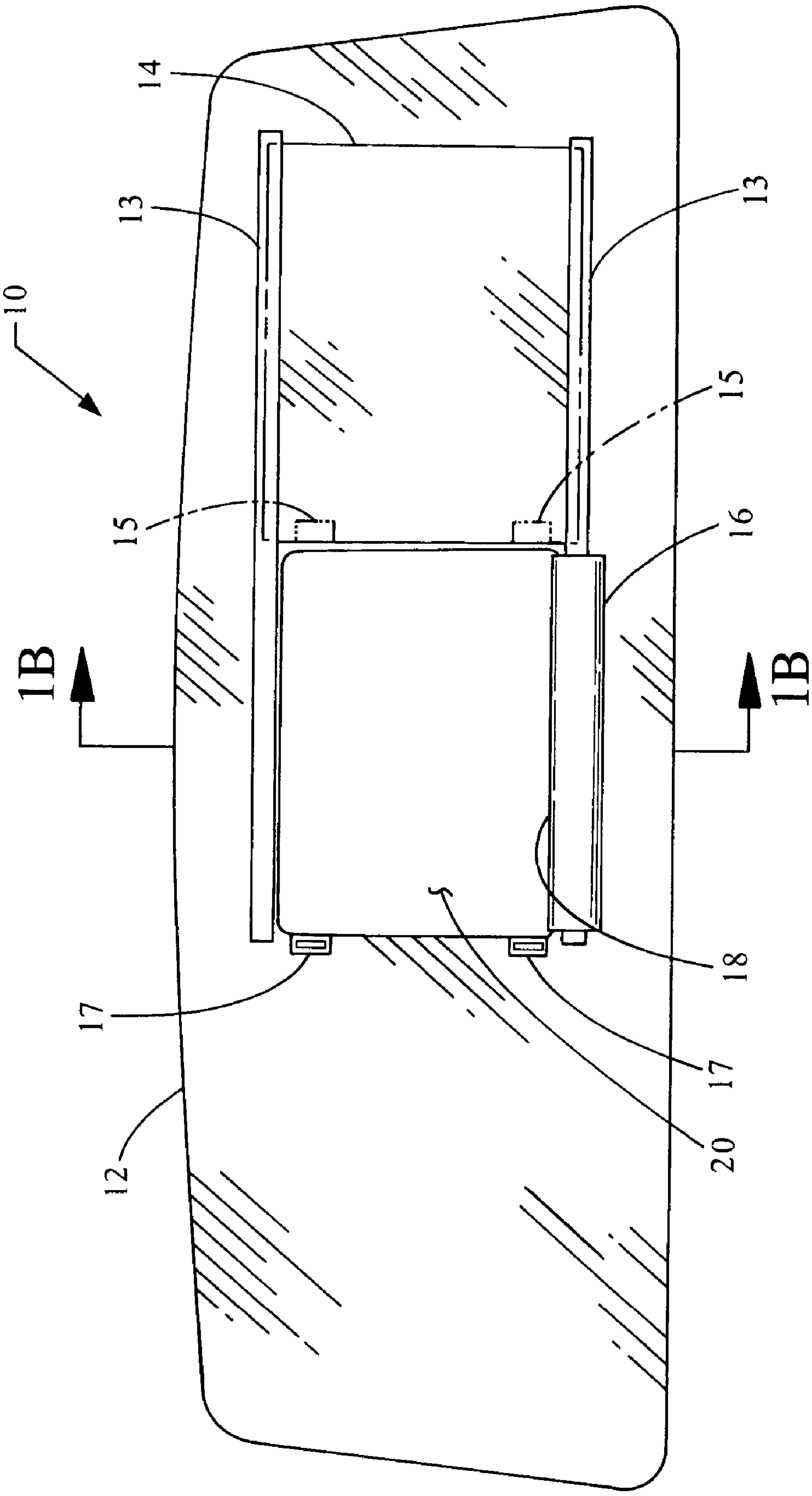
FIG. 1A is a back view of a sliding window assembly in an open position with a protective edge cover flap in accordance with an embodiment of the invention.
Figure 1B:
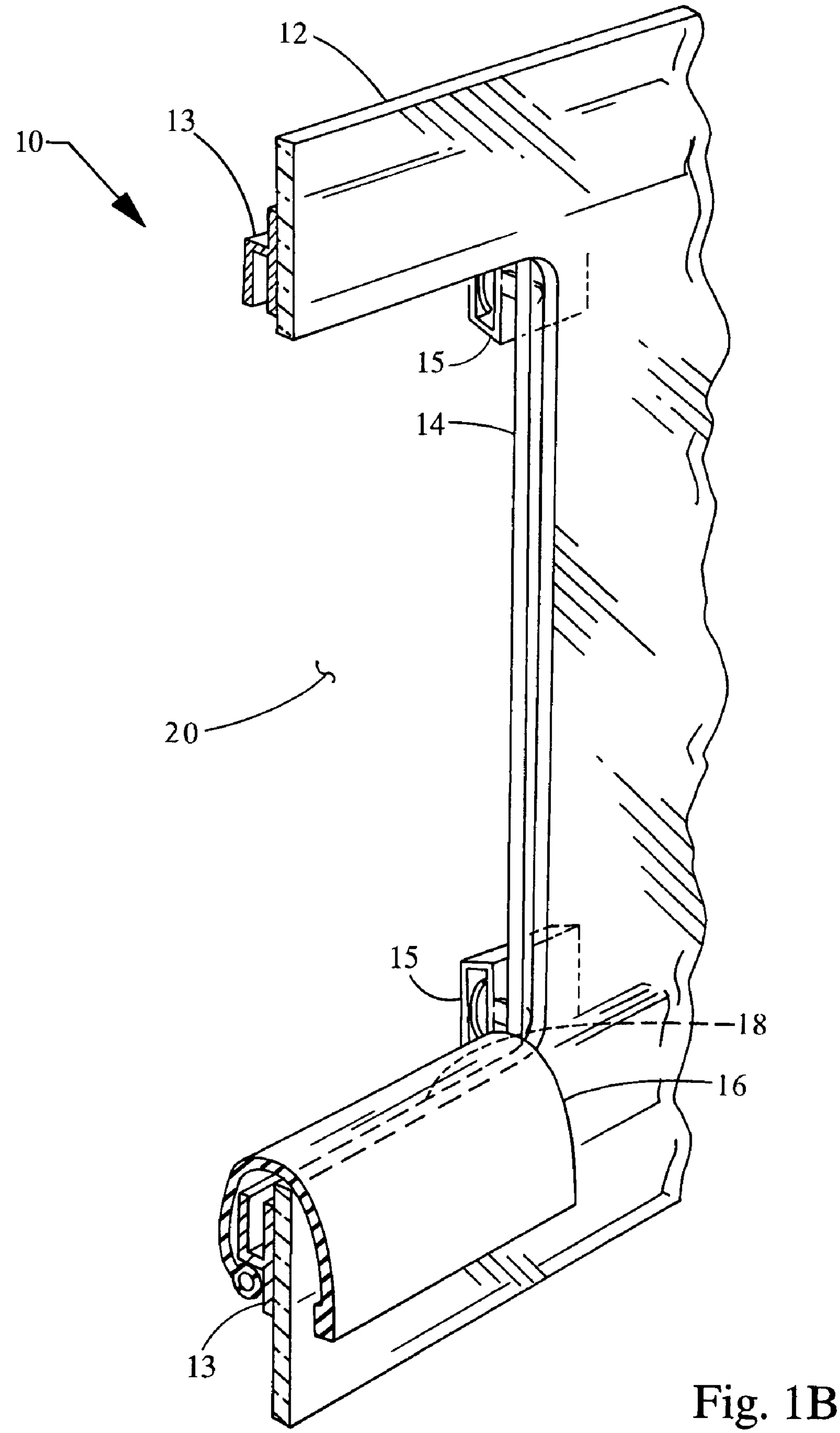
FIG. 1B is a perspective view of a portion of the sliding window assembly.

FIGS. 1A and 1B depict a sliding window assembly 10 with a fixed panel 12 and a slideable panel 14. In one example, the panels 12 and 14 are both of glass and are used as part of the backlight assembly of a vehicle, e.g., a pickup truck. Alternatively, either panel 12 or 14 or both can be made from a plastic. In operation, the slideable panel 14 slides back and forth relative to the fixed panel 12 along a pair of rails 13 so that a user, such as the driver or passenger, can move the panel 14 between an open position and a closed position.

In accordance with an embodiment of the invention, the window assembly 10 is also equipped with a protective edge cover 16 placed over an otherwise exposed edge 18 of an opening 20 in the fixed panel 12. The edge cover 16 can be a detachable. In the embodiment illustrated in FIGS. 1A and 1B, the edge cover 16 is a "U"-shaped clip of rubber (or some other suitable durable material) that fits snugly over the edge 18. Thus, the U-shaped cover 16 can simply be inserted over the edge 18 of the panel 12, and thereby isolate or insulate the exposed edge 18 of the panel 12 from direct contact with cargo that might come to rest on the edge of the glass when the sliding panel 14 is in the open position. When the protective function of the cover 16 is not desired, the user removes the cover 16 by simply pulling the cover 16 away from the edge 18, and the user can then move the sliding panel 14 to the closed position and lock the sliding panel in place with a pair of latches 15 that mate with a pair of attachments mechanisms 17 on the panel 12.

In its closed position, the slideable panel 14 covers the opening 20 in the fixed panel 12. In its open position, the slideable panel is moved to the side to uncover the opening 20. A user may then place cargo in the bed of the truck such that the cargo extends through the opening 20 into the cab of the truck and rests on top of the cover 16. As mentioned above, the cover 16 functions as a protective cover for the lower edge 18 of the opening 20. Accordingly, the edge 18 is protected from impact forces and abrasion from the cargo extending through the opening 20. Thus, the user can place cargo on the edge 18, for example, the lower edge of an opening in a sliding glass backlight assembly of a pickup truck, without concern for damaging the panel 12.

Figure 2:
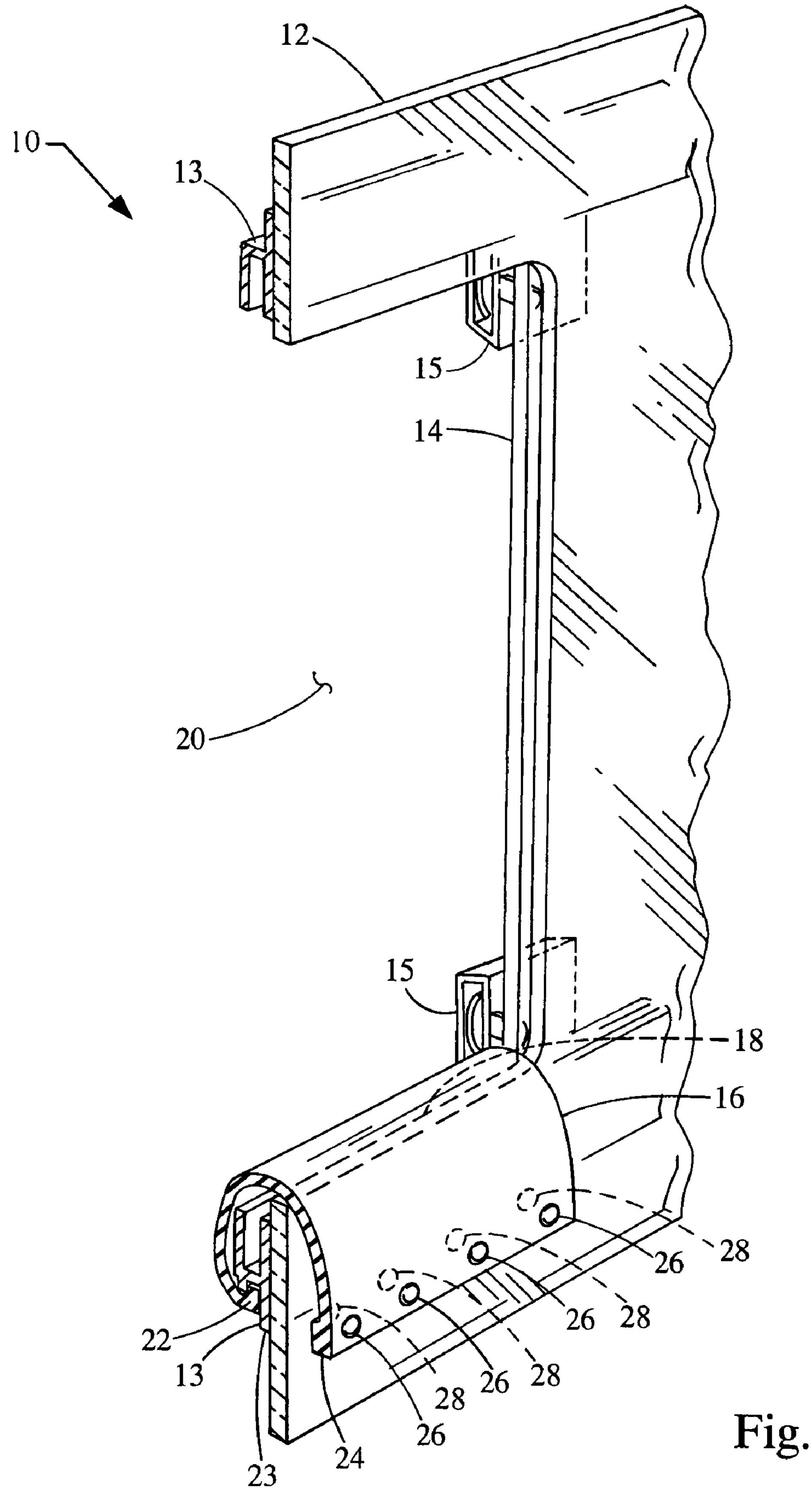
FIG. 2 is a perspective view of a portion of a sliding window assembly in an open position with a protective edge cover flap in accordance with another embodiment of the invention.

Referring now to FIG. 2, the cover 16 can be a protective sheet integrated into the design of the window assembly 10. In this configuration, the cover 16 cannot become separated and lost or displaced.

The cover 16 can be equipped with attachment features, for example, protrusions or snaps, which mate with attachment features formed on the fixed panel 12 or on the support structure in which the fixed panel 12 is mounted.

The attachment features of the cover 16 are releasable from those on the fixed panel 12 or the nearby support structure of the cab in which the fixed panel is mounted. The attachment features can be configured for attaching the cover 16 either to the inside or outside of the fixed panel 20 or to both sides.

In one implementation, the cover 16 has one end 22 coupled, for example, to the fixed panel 12 or the support structure for the fixed panel 12 by a hinge, adhesive, screw, or other suitable fastening mechanism 23. The other end 24 of the cover 16 is equipped with a releasable fastening feature 26, for example, a snap, hook and loop fastener, latch, or VELCRO and the panel 12 or support structure is equipped with a corresponding fastener feature 28 located on the opposite side of the panel 12 from the fastening mechanism 23. The fastener feature 28 mates with the fastening feature 26 in a releasable manner.

To use the cover 16, the user pulls the end 24 of the cover 16 and extends it through the opening 20 to cover the edge 18. The user then secures the fastening features 26 with the respective fastening features 28 to hold the cover 16 in place.

The implementation shown in FIG. 2 can be configured with the fixed end 22 coupled either to the outside or inside of the panel 12. Thus, in certain arrangements, the protective edge cover flap 16 can be pulled from outside the cab, and in other arrangements, the cover 16 is pushed from inside the cab through the opening 20.

While the above description contains specificities, these should not be construed as limitations on the scope of the invention, but merely as examples of the presently preferred embodiments. Other variations are possible within the teachings of the invention. For example, the protective material of the cover 16 can be made from polyurethane, or polyvinyl and KEVLAR, or any other suitable abrasion resistant material. The cover 16 can have any suitable thickness that isolates impact forces from being imparted on the bottom edge of the panel by the cargo. Moreover, the protective material can be suitably colored and textured to coordinate with passenger compartment trim materials.

What is claimed is:

1. A window assembly for a vehicle comprising:

a fixed window with an opening;

a movable window panel which slides relative to the fixed window to cover or expose the opening in the fixed window; and a flexible cover in one position over a bottom edge of the opening and in a second position allowing the movable window panel to cover the opening, the cover having a first end and a second end, the first end being attached to a lower portion of the fixed window with an attachment fixed directly to the fixed window, the cover being able to pivot about the attachment to drape over the bottom edge or to hang away from the opening, the second end and the fixed window being provided with attachment mechanisms to attach the second end to the fixed window in a removable manner, both the first end and the second end extending across the width of the cover substantially parallel to the bottom edge of the opening.

2. The window assembly of claim 1, wherein the attachment is on the interior of the fixed window.

3. The window assembly of claim 1, wherein the attachment mechanisms are on the exterior of the fixed window.

4. The window assembly of claim 1, wherein the cover is made from polyurethane.

5. The window assembly of claim 1, wherein the cover is made from polyvinyl and Kevlar.

* * * * *